United States Patent
Harms

[15] 3,705,280
[45] Dec. 5, 1972

[54] INTERLOCK FOR CIRCUIT BREAKER SWITCHES
[72] Inventor: Harry Keith Harms, Los Angeles, Calif.
[73] Assignee: Excel Electrical Supply Co., Van Nuys, Calif.
[22] Filed: June 4, 1971
[21] Appl. No.: 150,044

[52] U.S. Cl. .............................................200/50 C
[51] Int. Cl. ..................................................H01h 9/26
[58] Field of Search ........................200/50 C, 172 A

[56] References Cited
UNITED STATES PATENTS
3,647,997   3/1972   Nerem...................................200/50
3,198,898   8/1965   Piteo....................................200/50 C
3,492,448   1/1970   Phillips................................200/50 C Primary Examiner—Robert K. Schaefer
Assistant Examiner—M. Ginsburg
Attorney—Allan M. Shapiro

[57] ABSTRACT

Circuit breaker switches which have their load sides connected to the same bus, from diverse power sources, are mechanically interconnected so only one switch can be in the on condition at any one time. The passive mechanical interconnection comprises an inextensible interlock link between the handles on the circuit breaker switches.

7 Claims, 7 Drawing Figures

PATENTED DEC 5 1972
3,705,280
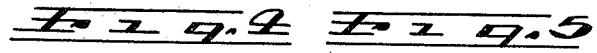
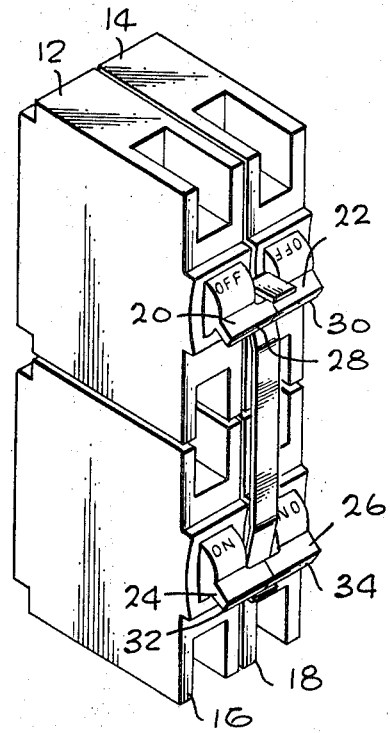
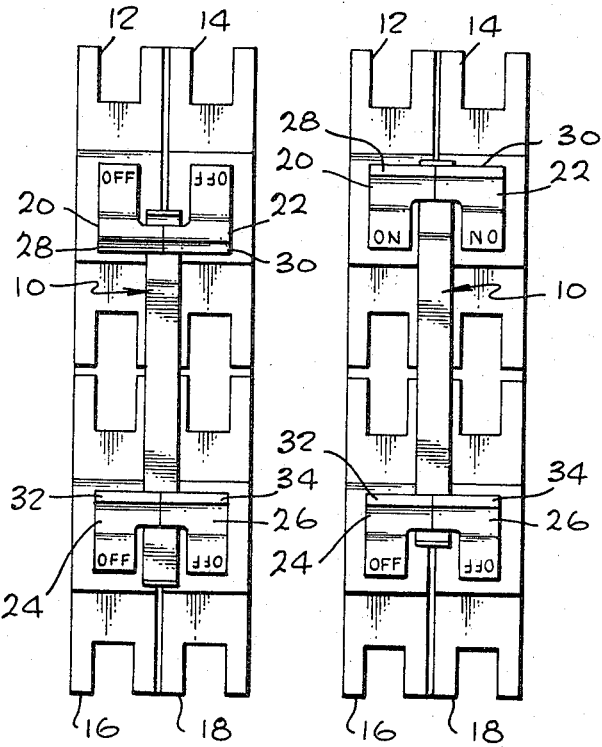
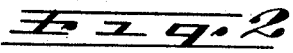
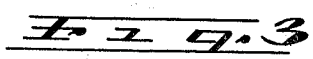
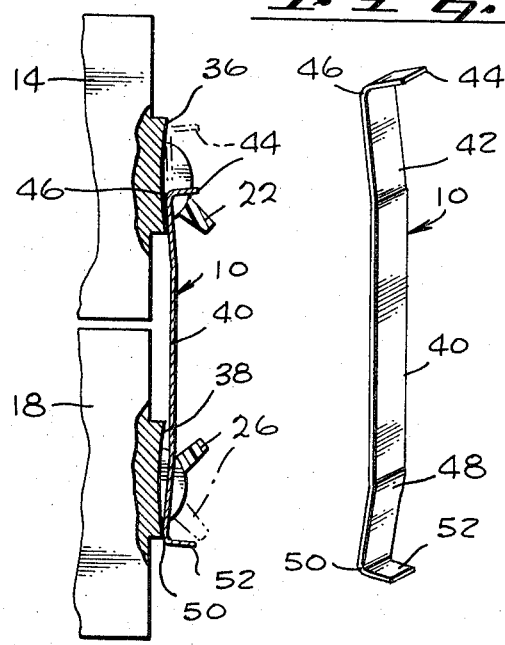
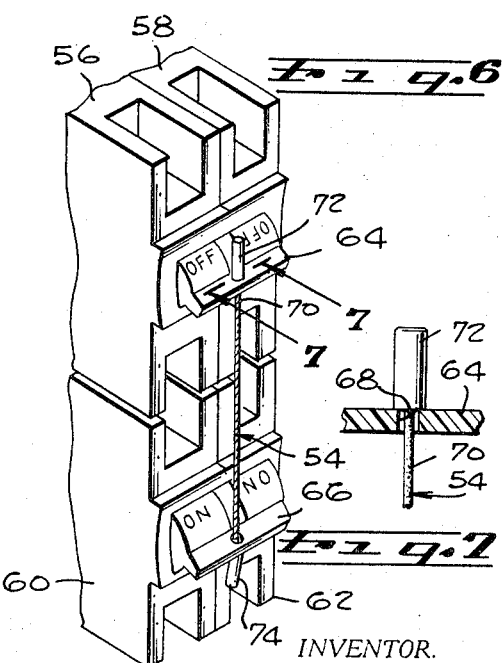
INVENTOR.
HARRY KEITH HARMS
BY Allen M. Shapiro
ATTORNEY

INTERLOCK FOR CIRCUIT BREAKER SWITCHES

BACKGROUND OF THE INVENTION

1. Field of the Invention

This invention is directed to an interlock for circuit breaker switches, including a link between the handles of the switches so that, when either of the switches is turned on, the other is required to be off.

2. Description of the Prior Art

In present-day electrical supply systems, there are occasions where a bus is to be alternatively supplied from one electrical power source into another. Such situations have arisen in power stations where massive quantities of power are handled. Interlocking of high power circuit breakers is known, especially where two sources of power are employed in parallel at the same time to supply power to the common bus which, in turn, distributes the power to a load. Such power station equipment is necessary for its task but, in those situations where the voltage is lower and current can be interrupted with an ordinary switch, its complexity is unnecessary.

The same problem arises in other facilities which are normally supplied from a central power station, but have a second power supply also available. In a few situations, the diverse sources of power supply electricity of different frequency or voltage so that interconnection therebetween would be disastrous.

One of the situations where diverse sources can alternatively supply the same bus is in a recreational vehicle. Some recreational vehicles are supplied with their own 115-volt A.C. generator, which supplies the bus through a suitable switch when power is needed and a plug-in supply from the outside is not available. The other source of current is the regular plug-in from a power station source, and this 115-volt A.C. source is also connectable to the bus through a suitable switch. Most recreational vehicles have a 12-volt D.C. source of power as well as one or both of the provisions for a 115-volt A.C. source. Problems arise when both switches to two different power sources are on at the same time.

SUMMARY OF THE INVENTION

In order to aid in the understanding of this invention, it can be stated in essentially summary form that it is directed to an interlock for circuit breaker switches wherein first and second circuit breaker switches are mounted in opposed orientation and have their operating handles mechanically interconnected by an inextensible interlock link so that they are mutually constrained whereby only one of the circuit breaker switches can be in the on condition at any one time.

It is accordingly an object of this invention to provide an interlock for two circuit breaker switches which prevents both of the switches from being in the on condition at the same time. It is a further object to provide an interlock for two adjacent opposed circuit breaker switches which permits both of them to be off at the same time. It is still another object to provide a logic element in the form of a mechanical OR-gate interconnecting two circuit breaker switches which permits one or the other to be on at the same time. It is yet another object to provide two circuit breaker switches which are connectable to diverse power sources, and which are connected on their load sides to a common bus, and to provide an interlock therefor which prevents the diverse power sources from being connected together through the circuit breaker switches. It is still another object to provide two circuit breaker switches mounted in opposed relationship to each other and to interlock the operating handles thereof so that they can both be in the off position, but only one at a time can be in the on position, and "on" actuation of one switch automatically causes "off" deactuation of the other switch.

Still other objects, features and attendant advantages of the present invention, together with various modifications, will become apparent to those skilled in the art from a reading of the following detailed description of the preferred embodiments constructed in accordance therewith, taken in conjunction with the accompanying drawings wherein like numerals designate like parts in the several figures.

BRIEF DESCRIPTION OF THE DRAWINGS

FIG. 1 is an isometric view of the preferred embodiment of the interlock for circuit breaker switches in accordance with this invention, in conjunction with two pairs of circuit breaker switches positioned in opposed relationship to each other, showing one of the pairs of switches in the off position and the other in the on position.

FIG. 2 is an enlarged side elevational view thereof, with parts broken away and parts taken in section.

FIG. 3 is an enlarged isometric view of the interlock of this invention.

FIG. 4 is a front elevational view of the circuit breaker switches with the interlock of this invention, showing both of the switches in the off position.

FIG. 5 is a view similar to FIG. 4 and showing the upper switch in the on position.

FIG. 6 is an isometric view of another embodiment of the interlock for circuit breaker switches of this invention.

FIG. 7 is an enlarged sectional view, with parts broken away, taken generally along the line 7—7 of FIG. 6.

DESCRIPTION OF THE PREFERRED EMBODIMENTS

The preferred embodiment of the interlock for circuit breaker switches is generally indicated in FIGS. 1 through 5 by the reference numeral 10. It is illustrated in connection with circuit breaker switches 12, 14, 16 and 18. The circuit breaker switches 12 through 18 illustrated in the drawings are specifically of the type manufactured by Federal Pacific Electric Company, of Newark, New Jersey. They are identified by the manufacturer by the trademark "STAB-LOK," Type NA. Such circuit breaker switches are particularly configured to be introduceable into and secured onto a panel, beneath which are positioned buses. When snapped into the panel, the circuit breaker switches electrically contact the buses. Thus, in ordinary installations, no special connections need be made between the circuit breaker switches and the buses.

It is conventional in such circuit breaker switches to have operating handles, respectively identified at 20, 22, 24 and 26. In normal operations, these handles can be employed to manually on-and-off-switch the circuit controlled by that switch. Normally, such switches include circuit breaker structure so that, when the device is oncswitched and a current overload occurs, internal mechanism causes the device to off-switch. Thus, both functions are combined in a single unit.

Additionally, it is conventional to be able to place two switches, such as 12 and 14, and 16 and 18, in laterally adjacent pairs to each other so that they can be ganged together. In the particular switches illustrated, ganging of a pair is accomplished by a cantilevered extension end on the handle of one switch lies adjacent the similar cantilevered extension end of the adjacent handle. Thus, the switch operating handles are provided with cantilevered extension ends 28, 30, 32 and 34 respectively. As is clearly seen in FIG. 1, these ends lie adjacent each other. Furthermore, they are connected to each other by any suitable engagement means, such as a pin extending into a hole in adjacent cantilever extension ends. In another type of construction, these handles may be unitarily formed. In still another type of construction, a pin and spacer may extend between the handles 20 and 22, even though they are not provided with cantilever extension ends.

When interconnected in such manner, both of the switches 12 and 14, or 16 and 18, must operate together. These switches may be connected to switch both the neutral line and the voltage carrying line, or they may be connected to switch related lines with voltage above and below neutral, as in household 230-volt circuits. In the present embodiment, they are conventionally used for the neutral and voltage-carrying line. Thus, switch operation, whether by manual or overload operation of either of the lines, causes disconnection of both.

A pair of laterally-positioned switches 12 and 14 also have another pair of laterally-positioned switches 16 and 18 positioned in line therewith in opposed relationship. As seen in the drawings, both opposed pairs are provided with ganged operating handles as described above. The specific configuration of the operating handles of the Federal Pacific Electric Company "STAB-LOK" Type NA switch provides a space under these cantilever extension ends in which the interlock 10 can be inserted. Furthermore, the bodies of circuit breaker switches 12 through 18 are such as to provide guide bosses, two of which are illustrated at 36 and 38, in FIG. 2, beneath the cantilever extension ends.

Interlock 10 is passive and substantially inelastic in the longitudinal direction. It is conveniently a metallic strip of substantially rectangular configuration, as seen in FIG. 3. It has a straight center section 40 and its ends are symmetrical about a transverse center line. The upper end is bent back at 42 with a stop 44 curved forward, in a smooth arc, substantially 90 degrees with respect to the plane of the center section. Thus, the backward bend at 42 presents a bearing area 46 which is positioned behind the rear of the plane of straight center section 40. Bearing area 46 bears against the guide boss 36 and maintains the end of stop 44 a sufficient distance above guide boss 46 so that it always extends as far above the guide boss (in the right-hand direction in FIG. 2) as the undersurface of the cantilever extension end 28. Thus, the curved outer end of stop 44 is sufficiently high to always engage both of the cantilever extension ends 28 and 30 of the operating handles of circuit breaker switches 12 and 14.

Similarly, the lower end of interlock 10 has the bend 48 which places bearing area 50 behind the plane of the straight center section 40. Furthermore, the lower end of interlock 10 terminates in a stop 52 of sufficient height to engage both of the cantilever extension ends 32 and 34. It is understood that the configuration of the particular interlock 10 shown is especially suited for the specific switch identified. Certain modifications thereto may be necessary for other switch configurations. In any event, the interlock 10 must be such as to provide stops, such as stops 44 and 52, which engage upon the operating handles of opposed switches, with a maximum dimension therebetween.

The circuit breaker switches 12, 14, 16 and 18 are such that, when the handles 20 and 22 of the upper pair are turned upward, as shown in FIG. 5, the upper pair of switches is on. Similarly, the handles 24 and 26 and switches 16 and 18 are such that, when they are turned down, as shown in FIG. 1, both switches of the lower pair are on. The dimension between stops 44 and 52 is such that only one pair of the opposed switch pairs can be on at a time. For example, with the lower switches 16 and 18 in the on position of FIG. 1, stop 44 prevents the switch operating handles 20 and 22 of the upper switches 16 and 18 in the on position of FIG. 1, stop 44 prevents the switch operating handles 20 and 22 of the upper switches 12 and 14 from being moved to the on position. When they are moved to the on position, as shown in FIG. 5, stop 52 prevents the operating handles 24 and 26 of the lower switches 16 and 18 from being moved to the on position. Furthermore, if one of the switches is moved from the off to the on position, the switch operating handles engage the adjacent stop and move the interlock along with it. Such movement causes the other pair of switches to be off-switches before the pair going toward the on-switched condition are actually on-switched. Interlock 10 is thus a logic device which prevents the opposed pairs of switches from being on at the same time and, in fact, turns one from on to off when the opposite one is going from off to on. It is a passive logic device which acts as an OR-gate, which permits only one or the other to be on at any particular time. It will be noted, however, that both the upper and lower switches may be off at the same time, as illustrated in FIG. 4, in order to permit the switches to perform their circuit breaking functions.

FIGS. 6 and 7 show another embodiment of the interlock for circuit breaker switches. In this embodiment, the interlock is identified by the reference character 54. Interlock 54 is associated with circuit breaker switches 56, 58, 60 and 62. These circuit breaker switches are of the same general nature as those described with respect to the interlock 10, but instead of the cantilevered extension ends being joined by a connector device, the handles of lateral pairs of the circuit breaker switches 56, 58, 60 and 62 are joined by crossbars which engage upon or unitarily from the operating handles of the laterally-adjacent switch pairs. As illustrated in FIG. 6, crossbar 64 comprises the operating handle of the upper pair of switches 56 and 58, while crossbar 66 comprises the operating handle of the lower pair of switches 60 and 62. As best seen in FIG. 7, crossbar 64 is provided with a hole 68 through which the interlock 54 extends. A U-shaped crossbar can be clamped over the operating handles of adjacent circuit breaker switches, or other configurations can result in an adjoining of the operating handles. In any event, the crossbar serves as the operating handle connection device and has a hole therethrough. Similarly, crossbar 66 has a hole therethrough.

Interlock 54 has a flexible, but substantially inextensible center section 70. The illustrated multiple strand steel cable is suitable for such use. The cable section 70 extends through the holes in crossbars 64 and 66, and carries stops 72 and 74 on the cable on the outside of these crossbars. The distance between the stops 72 and 74 is such that, when considering the opposed pairs of aligned circuit breaker switches, when one of the lateral pairs is on, the other is constrained to be off. Furthermore, the distance between the stops 72 and 74, and the manner in which they engage the crossbars, is such that, if one of the pairs is on, and the other is manually being turned on, the first is switched off before the second is turned on. This prevents opposite, facing switches from being on at the same time. Thus, the interlock 54 is also a passive logic element in the form of an OR-gate, which permits only one or the other of facing pairs of circuit breaker switches to be on at any time. Of course, since the center section 70 is free in the holes in the crossbars, both pairs of circuit breaker switches can be off at the same time.

The interlock is not constrained to operate only with pairs of adjacent switches. For particular example, the embodiment of FIGS. 6 and 7 can be employed with a single switch facing an opposed single switch, by drilling a hole in the operating handle of each switch. Furthermore, such an interlock may be employed with more than two lateral switches. Any convenient number can be ganged together, as long as it is desired that they be operated together.

While particular embodiments of the present invention have been shown and described, those skilled in the art will find that changes and modifications may be made without departing from the spirit of this invention, and therefore the aim in the appended claims is to cover all such changes and modifications as fall within the true spirit and scope of this invention.

What is claimed is:

1. An interlock for circuit breaker switches in combination with first and second circuit breaker switches where said first and second switches are positioned in tandem alignment and respectively have first and second external switch operating handles thereon, said switches being oriented so that said handles are positioned away from each other when the switches are on and toward each other when the switches are off, said combination comprising:
said interlock comprising an elongate member having a first stop at one end and a second stop at the other end, said stops facing each other and being positioned on the sides of said first and second operating handles away from said respective second and first switches so that, when one of said operating handles is moved from the off to the on position, each of said stops is engaged by its corresponding one of said operating handles whereby said member is pulled by such one operating handle in the direction to cause the other switch operating handle to pull the other switch from the on to the off position.

2. The combination of claim 1 wherein
said elongated member comprises a flexible, substantially non-extensible wire cable and said stops are cylindrical members clamped adjacent the ends of said wire cable, said wire cable passing through openings in said operating handles of said first and second switches.

3. An interlock for circuit breaker switches in combination with first and second circuit breaker switches where said first and second switches are positioned in tandem alignment and respectively have first and second external switch operating handles thereon, said switches being oriented so that said handles are positioned away from each other when said switches are on and toward each other when said switches are off, said combination comprising:
said interlock having an elongate metallic bar having a face which defines a plane, a first stop at one end of said bar and a second stop at the other end of said bar, said stops being bent ends of said metallic bar bent out of said plane, said stops facing each other and being positioned on the sides of said first and second operating handles away from said respective second and first switches so that, when one of said operating handles is moved from the off to the on position, said interlock bar is pulled by such one operating handle by engagement on its corresponding stop in the direction to cause the other stop to engage the other switch operating handle to pull the other switch from the on to the off position.

4. The combination of claim 3 wherein
said metallic bar has a substantially rectangular cross section and a straight center section which forms the face of said bar and defines the plane of said bar, said bar being bent rearward of said plane at each end of said center section to form bearing areas and said bar being bent forward from said bearing areas to form said first and second stops at the ends of said interlock, said bearing areas bearing on said tandem positioned switches adjacent said switch operating handles thereon.

5. The combination of claim 3 wherein
there is a laterally-adjacent switch adjacent each of said first and second facing opposed circuit breaker switches, the switch operating handles of laterally-adjacent switches being interconnected together so that said laterally-adjacent switches are constrained to operate together.

6. The combination of claim 5 wherein
said laterally-adjacent switches are connected together by means of connection means connected between the switch operating handles of laterally-adjacent circuit breaker switches for operating said switch operating handles together, said interlock engaging said handle connection means.

7. An interlock for circuit breaker switches in combination with first and second circuit breaker switches, said switches each having an external operating handle and said switches being positioned in tandem aligned opposed position so that, when the switch operating handles are positioned toward each other, both said circuit breaker switches are in the off condition and, when the circuit breaker handles are in a position away from each other, both said switches are in the on condition, each of said handles having an outwardly facing engagement surface thereon, said combination comprising:

said interlock comprising a substantially inextensible elongated body made of a metallic bar of substantially rectangular cross section which has a straight center section which forms the face of said bar and defines the plane of said bar, said bar being bent rearwardly of said plane at each end of said center section to form bearing areas toward each end of the bar from the center section thereof, first and second stops respectively positioned on the ends of said bar, said first and second stops facing each other, said bar being bent forward from said bearing areas to form said first and second stops adjacent the ends of said interlock, said stops being engageable on the engagement surfaces of said handles of said first and second switches and being spaced apart such a dimension that only one of said switches can be in the on position at a time, said bearing areas bearing on said opposed positioned switches adjacent said switch operating handles thereon.

* * * * *